US010345486B2

(12) United States Patent
Menicucci et al.

(10) Patent No.: US 10,345,486 B2
(45) Date of Patent: *Jul. 9, 2019

(54) APPARATUS AND METHOD FOR SOLAR ENERGY MICRO-FORECASTS FOR SOLAR GENERATION SOURCES AND UTILITIES

(71) Applicant: STC.UNM, Albuquerque, NM (US)

(72) Inventors: Anthony Robert Menicucci, Albuquerque, NM (US); Thomas P. Caudell, Edgewood, NM (US); Andrea A. Mammoli, Corrales, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,167

(22) Filed: Jan. 22, 2018

(65) Prior Publication Data

US 2018/0143348 A1 May 24, 2018

Related U.S. Application Data

(63) Continuation of application No. 14/673,692, filed on Mar. 30, 2015, now Pat. No. 9,921,339.

(60) Provisional application No. 61/972,758, filed on Mar. 31, 2014.

(51) Int. Cl.
| | |
|---|---|
| *G01W 1/10* | (2006.01) |
| *G01J 5/00* | (2006.01) |
| *H02J 3/00* | (2006.01) |
| *G06Q 10/04* | (2012.01) |
| *G06Q 50/06* | (2012.01) |
| *H02J 3/38* | (2006.01) |
| *G01J 1/42* | (2006.01) |

(52) U.S. Cl.
CPC ............. *G01W 1/10* (2013.01); *G01J 5/00* (2013.01); *G06Q 10/04* (2013.01); *G06Q 50/06* (2013.01); *H02J 3/00* (2013.01); *G01J 2001/4266* (2013.01); *H02J 3/383* (2013.01); *H02J 2003/007* (2013.01); *Y02E 10/563* (2013.01); *Y02E 60/76* (2013.01); *Y04S 10/54* (2013.01); *Y04S 40/22* (2013.01); *Y10T 307/533* (2015.04); *Y10T 307/604* (2015.04)

(58) Field of Classification Search
CPC ....................................................... G01W 1/10
USPC ......................................................... 307/49
See application file for complete search history.

(56) References Cited

U.S. PATENT DOCUMENTS

| | | |
|---|---|---|
| 2002/0084655 A1 | 7/2002 | Lof et al. |
| 2012/0144828 A1 | 6/2012 | Lazaris |
| 2013/0218355 A1 | 8/2013 | Lazaris |
| 2014/0278108 A1 | 9/2014 | Kerrigan et al. |

(Continued)

OTHER PUBLICATIONS

Ellis et al., "PV Output Smoothing with Energy Storage," IEEE, 2011.

(Continued)

*Primary Examiner* — Joseph Chang
(74) *Attorney, Agent, or Firm* — Valauskas Corder LLC (57) ABSTRACT

The present invention is an apparatus and method of forecasting solar energy irradiance potential and subsequent photovoltaic output in a region. The apparatus and method includes collecting meteorological data for a given region and then estimating irradiance levels using parameters collected from the meteorological data. Solar energy production is then simulated using the collected meteorological data, estimated irradiance levels, and physical characteristics of a solar generating system in the given region at a predetermined time.

22 Claims, 11 Drawing Sheets

(56) References Cited

U.S. PATENT DOCUMENTS

2015/0019034 A1     1/2015    Gonatas
2015/0276980 A1    10/2015    Menicucci et al.

OTHER PUBLICATIONS

Johnson et al., "Initial Operating Experience of the 1.2-MW La Ola Photovoltaic System," Sandia National Laboratories, Tech. Rep., 2011.
Sfetsos et al., "Univariate and Multivariate Forecasting of Hourly Solar Radiation With Artificial Intelligence Techniques," Solar Energy vol. 68, No. 2, pp. 169-178, 2000.
Yona et al., "Application of Recurrent Neural Network to Short-Term-Ahead Generating Power Forecasting for Photovoltaic System," IEEE, 2007.
Urquhart et al., "Optimizing Geographic Allotment of Photovoltaic Capacity in a Distributed Generation Setting," NREL, 2012.
Chow et al., "Intra-hour forecasting with a total sky imager at the UC San Diego solar energy testbed," Solar Energy 85, 2011.
Lorenz et al., "Short term forecasting of solar radiation based on satellite data," Proceedings Eurosun (ISES Europe Solar Congress), 2004.
Cheng et al., "Applying Battery Energy Storage to Enhance the Benefits of Photovoltaics," IEEE, 2012.
Johnson et al., "PV Output Smoothing using a Battery and Natural Gas Engine-Generator," IEEE, 2013.
Healy et al., "Guaranteed Two-Pass Convergence for Supervised and Inferential Learning,"IEEE Transactions on Neural Networks, vol. 9, No. 1, 1998.
Lavrova et al., "Analysis of Battery Storage Utilization for Load Shifting and Peak Smoothing on a Distribution Feeder in New Mexico," IEEE, 2011.
Bacher et al., "Online short-term solar power forecasting," Solar Energy 83, 2009.
Soliz et al., "Inferring future states of the atmosphere with a laterally primed adaptive resonance theory (lapart) neural network," Proceedings of the World Congress on Neural Networks, 1996.
Perez et al., "Validation of short and medium term operational solar radiation forecasts in the US," Solar Energy 84, 2010.
Taylor et al., "An Autonomous Distal Reward Learning Architecture for Embodied Agents," Procedia Computer Science 13, 2012.
Caudell et al., "Retrospective Learning of Spatial Invariants During Object Classification by Embodied Autonomous Neural Agents," IEEE, 2011.
Caudell et al., "Studies of Inference Rule Creation using LAPART," IEEE, 1996.
Dong et al., "Short-term solar irradiance forecasting using exponential smoothing state space model," Energy 55, 2013.
Mammoli et al., "Low-cost solar micro-forecasts for PV smoothing," 2013 1st IEEE Conference on Technologies for Sustainability (SusTech), Aug. 1, 2013.

APPARATUS AND METHOD FOR SOLAR ENERGY MICRO-FORECASTS FOR SOLAR GENERATION SOURCES AND UTILITIES

CROSS-REFERENCE TO RELATED APPLICATIONS

This application is a continuation claiming priority under 35 U.S.C. § 120 of U.S. patent application Ser. No 14/673,692, filed on Mar. 30, 2015, which claims the priority benefit of U.S. Provisional Patent Application No. 61/972,758, entitled "Apparatus and Method for Solar Energy Resource Micro-Forecasts for Solar Generation Sources and Utilities," filed on Mar. 31, 2014. The disclosures of the prior applications are incorporated herein by reference.

BACKGROUND OF THE INVENTION

Field of the Invention

Embodiments of the present invention include an apparatus and method for forecasting solar energy irradiance potential and subsequent photovoltaic output in a region.

Description of Related Art

Solar energy is becoming increasingly attractive to both retail and commercial consumers as a means to generate electricity. The main drawback to solar energy occurs when intermittent cloud cover moves over the solar field. This is known as solar resource intermittency. Currently, solar intermittency is only a small problem because the ratio of intermittent resources to fossil or nuclear energy sources is small. However, with increasing amounts of solar energy being integrated into electricity grids, solar intermittency can become a non-trivial problem for utilities.

Two methods of mitigating these intermittencies are currently employed by utilities. The first method involves generating electricity from another source and feeding that electricity to the area that was being supplied by solar. This electricity generation source can come from large scale batteries, fast responding natural gas generators or diverting electricity from one area to another. Batteries and other storage devices are being used to counteract the variation in power production from solar photovoltaic (PV) plants. These storage devices help maintain power quality as well as ensure that variability of distributed power generation does not cause unwanted uncertainty in power demand from the electric utility. A disadvantage of using batteries, however, is that they are expensive and susceptible to wear from excessive cycling. Calculations have shown that the integrated energy input/output to a battery system can be reduced by a factor of at least five if an approximately three minute forecast of PV production is available. A second mitigation strategy is to announce price signals and indicators specific to the occlusion event to incentivize a demand reduction, also known as a demand response. In both mitigation strategies, electricity quantities, either with excess electricity or shortage, have to be actively managed. Common to the success of electricity management with interment resources is a need for a forecast of solar energy irradiance potential and subsequent photovoltaic output predictions.

SUMMARY

An embodiment of the present invention includes a method of forecasting solar energy irradiance potential and subsequent photovoltaic output in a region for reducing energy requirements on a utility system. The method includes collecting meteorological data for a given region via a camera, estimating irradiance levels using parameters collected from the meteorological data via a neural network coupled to the camera, and forecasting solar energy irradiance potential and subsequent photovoltaic output in the given region using the collected meteorological data, estimated irradiance levels, and physical characteristics of a solar generating system in the given region at a predetermined time in the future via the neural network.

The camera of this embodiment is preferably a shadowband-less fixed camera using a Si-based sensor or other lower energy photon sensors. The method can include analyzing surrounding and occluding clouds as seen from one or more pictures from the camera. The camera can take a picture with lower energy photon wavelengths and is less sensitive to higher energy photon wavelengths. The method preferably includes simulating future solar energy production of the utility system based on the forecast of solar energy irradiance potential and subsequent photovoltaic output. The neural network may have a neural network architecture. The network architecture can be a fuzzy artmap architecture. The neural network architecture may have weighted connections associated with each category neuron in a layer that adapts during learning. The neural network can include a sub-network and wherein cloud images are processed and presented to the sub-network. The neural network can also include a second sub-network comprising a solar irradiance signal at a future time. The method can include smoothing photovoltaic output using a battery system based on the simulated future solar energy production and adjusting the energy requirements produced by the utility system based on the simulated future solar energy production.

Another embodiment of the present invention includes an apparatus for forecasting solar energy irradiance potential and subsequent photovoltaic output in a predetermined region for reducing energy requirements on a utility system. The apparatus can include a camera for collecting meteorological data for a given region, a neural network coupled to the camera for estimating irradiance levels using parameters collected from the meteorological data. The neural network forecasts solar energy irradiance potential and subsequent photovoltaic output in the predetermined region using the collected meteorological data, estimated irradiance levels, and physical characteristics of a solar generating system in the predetermined region at a predetermined time in the future. The neural network can also simulate future solar energy production. The utility system coupled to the neural network can include energy requirements that are adjusted based on the simulated future solar energy production determined by the neural network. The camera can be a shadowband-less fixed camera using a Si-based sensor or other lower energy photon sensors. The camera can alternatively be a far infrared imaging sensor. The neural network can include a neural architecture. The utility system preferably includes a photovoltaic system. The utility system can also include one or more batteries coupled to the photovoltaic system. The neural network can include a sub-network where cloud images are processed and presented to the sub-network and a second sub-network having a solar irradiance signal at a future time.

BRIEF DESCRIPTION OF THE FIGURES

FIGS. 2A and 2B are graphs showing solar irradiance signals sampled at about ten second intervals and smoothed with a trailing window and with a centered window using an about four minute window. FIG. 2A is a 4-minute window and FIG. 2B is a 10-minute window.

DETAILED DESCRIPTION

Embodiments of the present invention include an apparatus and method of forecasting solar energy irradiance potential and subsequent photovoltaic output in a region. The apparatus and method includes collecting meteorological data for a given region and then estimating irradiance levels using parameters collected from the meteorological data. Solar energy production is then simulated using the collected meteorological data, estimated irradiance levels, and physical characteristics of a solar generating system in the given region at a predetermined time. Collecting meteorological data can include collecting one or more pictures from a camera. Simulating solar energy production can include analyzing surrounding and occluding clouds as seen from the one or more pictures from the camera. The camera preferably takes picture with lower energy photon wavelengths and less sensitive to higher energy photon wavelengths. In this embodiment, a forecast of solar energy irradiance potential and subsequent photovoltaic output in the given region is also provided. A computational prediction of solar energy irradiance potential and subsequent photovoltaic output in the given region may also be provided. The computational prediction preferably includes a neural network. The computational prediction can also incorporate a neural network architecture.

An embodiment of the present invention includes an apparatus and method of using a neural network system to associate a cloud pattern category with a future solar irradiance category. In some embodiments, Adaptive Resonance Theory (ART), a type of neural network system, may be used to associate a cloud pattern category with a future solar irradiance category. ART can also be used in an embodiment of the present invention to analyze whole-house records to produce information for a solar hot water system.

Neural networks are machine-learning systems whose design and processing are inspired by biological nervous systems. These neural networks borrow from biology the notions of neurons as the elemental processing unit and the ways in which neurons are linked via unidirectional adaptive connections. Non-limiting examples of neural networks include but are not limited to feedforward neural networks, kohonen self-organizing networks, recurrent or bi-directional networks, radial basis function networks, supervised and unsupervised fuzzy and non-fuzzy maps, and particle image velocimetry techniques.

A network includes a wiring diagram or graph showing how neurons are interconnected. Some of the neurons have special roles in the network acting as interfaces to the environment; for example, receiving inputs from sensors or sending signals to motor controllers. The connections in a network have the job of transporting the output of one neuron to the input of another, and are characterized by their source and target neurons as well as their connection strength, usually represented as a weight.

The processing of an individual neuron is as follows: First, the neuron integrates all of its weighted inputs arriving on in-coming connections from other neurons. Second, it maps this integrated value through a possibly nonlinear function to form a new output. Third, it adapts the connection strengths on its in-coming connections.

The adaptive process is referred to as "learning" in this field, and falls into two broad classes: 1) supervised, and 2) self-organizing. The supervised method trains data having pairs of input/output samples. An input sample is supplied to the network through its input neurons, and the connection weights are modified to help the output neurons reproduce the output sample. The list of input/output samples is called the training set, and one learning pass through this set is called a training epoch. Through training over many epochs, the output neurons gradually begin to match the desired output behavior provided by the training set.

The second method functions quite differently. In self-organizing learning, the network is not supplied a desired output for its output neurons. Instead, during the learning epochs, the weights are modified to help the output neurons autonomously encode categories of systematic or regular patterns that exist in the input samples. Often this is referred to as discovery learning, where the network learns to respond with a unique output pattern when a member of a category of similar input patterns is presented to it.

A neural network and its learning methods are referred to as a neural architecture. Neural architectures are typically implemented as algorithms in computer software simulations. The "goodness" of a learning method is usually quantified by the number of training epochs required to reach a given level of output performance.

A preferred embodiment incorporates a neural architecture in the class of self-organizing learning systems, such as ART. When presented an input pattern, a self-organizing architecture rapidly categorizes it as a member of either an existing category or a new (novel) category. If an existing category matches the pattern, then the network responds with an existing output code indicating its membership in a category. If no existing category matches, then the network creates a new output code that will in the future respond to the novel pattern.

Solar Micro-forecasts for Improving the Efficiency of PV Farm Output Smoothing

Figure 1:
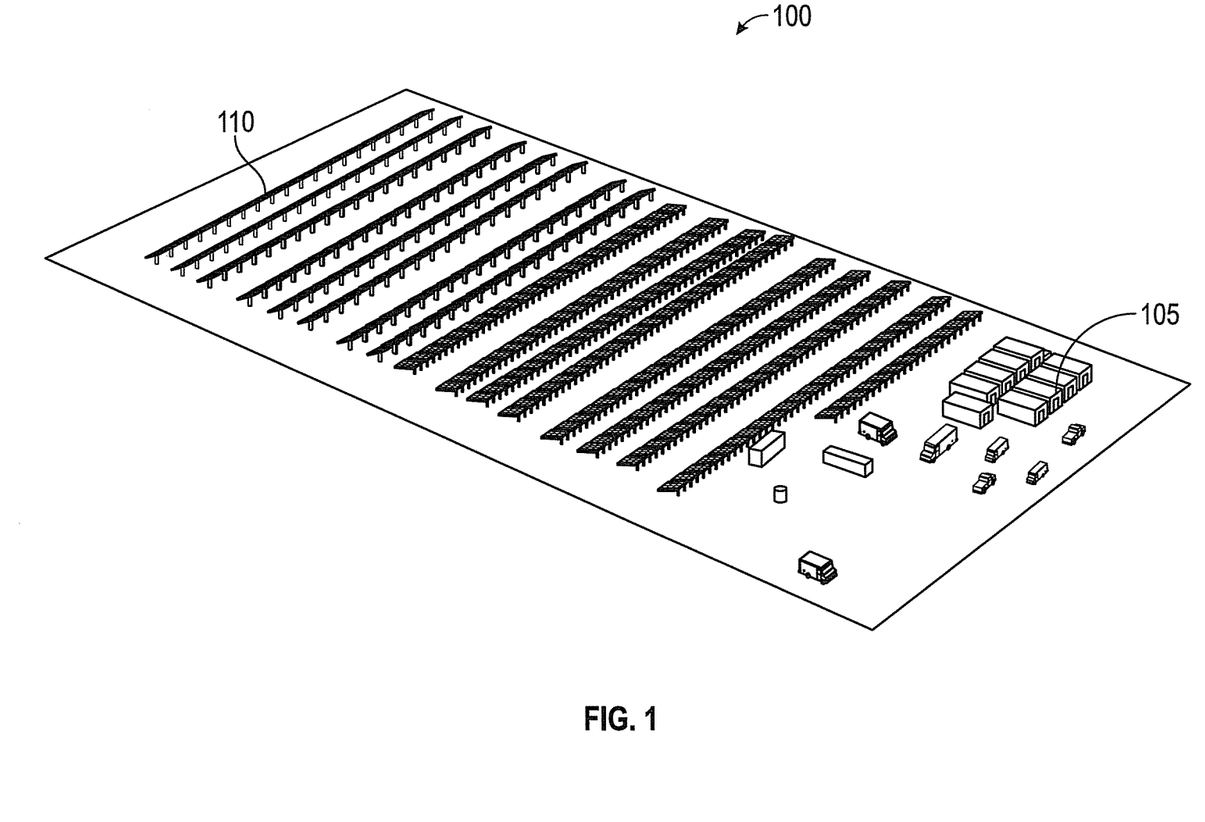
FIG. 1 illustrates an aerial view of a photovoltaic farm with battery storage.

Distribution level photovoltaic (PV) farms are becoming increasingly attractive for utilities to meet renewable portfolio standards. These installations, typically with peak power ranging from 0.5 MW to 2 MW, are generally cost-effective, and can be deployed in a matter of months, without lengthy transmission interconnection delays. Siting PV at a single location provides economies of scale in comparison to residential PV, and allows a utility to control and maintain the resource more effectively. However, because a PV array is within a small geographic area, it is more susceptible to cloud-driven intermittency than either large (>100 MW) installations or residential roof mounted installations of equivalent capacity. Batteries are sometimes deployed to offset power quality problems due to cloud-driven intermittency. In one non-limiting example, the deployment of a 500 kW PV farm with 1.0 MWh total smoothing and shifting batteries, located in Albuquerque, N. Mex. was analyzed. An aerial view of a plant 100 is shown in FIG. 1. Plant 100 is, for example, a 0.5 MW Prosperity PV plant with battery storage 105. Plant 100 occupies approximately four acres (16,000 square meters). Shifting and smoothing batteries 105 are shown as well as PV panels 110 in FIG. 1.

Figure 2A:
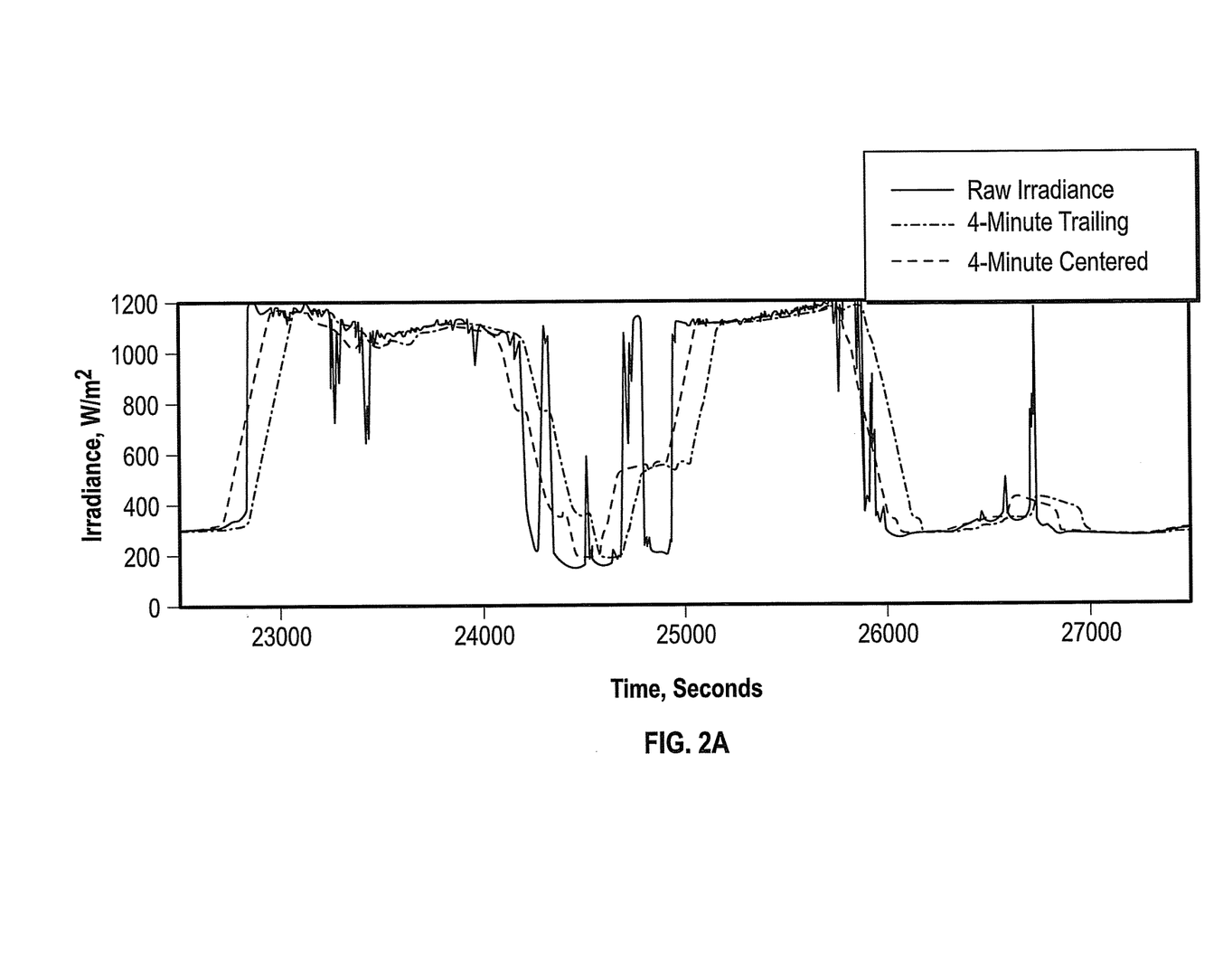
Figure 2B:
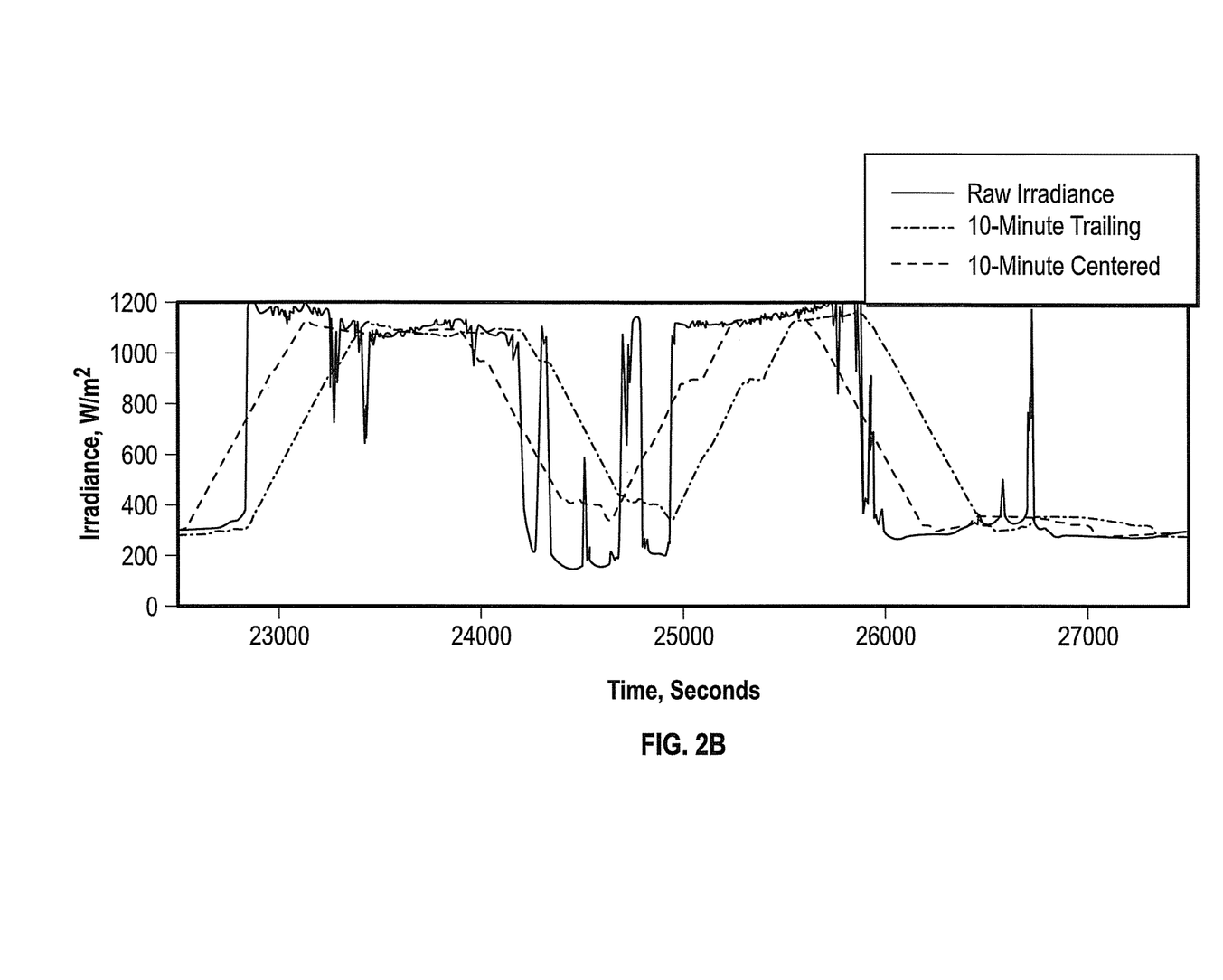

In the example, a 250 kWh subset of a battery system 105, capable of delivering up to 500 kW of power, is used to offset cloud-driven variability, by delivering power when clouds suddenly occlude the sun, and by absorbing power when the sun re-emerges. The magnitude of the power delivered or absorbed by the batteries is based on the difference between the instantaneous power produced by the PV farm, and an underlying 'smooth' power. The smooth signal is calculated a number of ways including, by using a moving average of the real-time power production, or by a low-pass filter. The size of the moving average generally ranges from about one minute to approximately thirty minutes. The raw signal, and moving averages obtained with a sliding windows of about 4-10 minutes are shown in FIGS. 2A and 2B. In this example, solar irradiance signals were sampled at about 10-second intervals (raw irradiance as a solid line in FIGS. 2A and 2B), and smoothed with a trailing window (dashed line with dot in FIGS. 2A and 2B) and with a centered window (dashed line in FIGS. 2A and 2B) using an about 4-minute window in FIG. 2A and an about 10-minute window in FIG. 2B.

The moving averages are preferably calculated using a window trailing the real-time signal, and using a window of the same size, but centered on the real-time signal. The trailing window signal lags the centered window signal by a time equal to half the size of the window, but is otherwise identical. To ensure that sufficiently smooth power is delivered to the grid, the power corresponding to the difference between the real-time irradiance and the averaged irradiance is supplied by the batteries according to:

$$P_{batt} = P_{smooth} - P_{PV}, \quad (1)$$

where $P_{batt}$ is the power supplied to the system by the battery, $P_{PV}$ is the power supplied to the system by the PV array, and $P_{smooth}$ is the PV array power averaged over the sliding window.

Figure 3A:
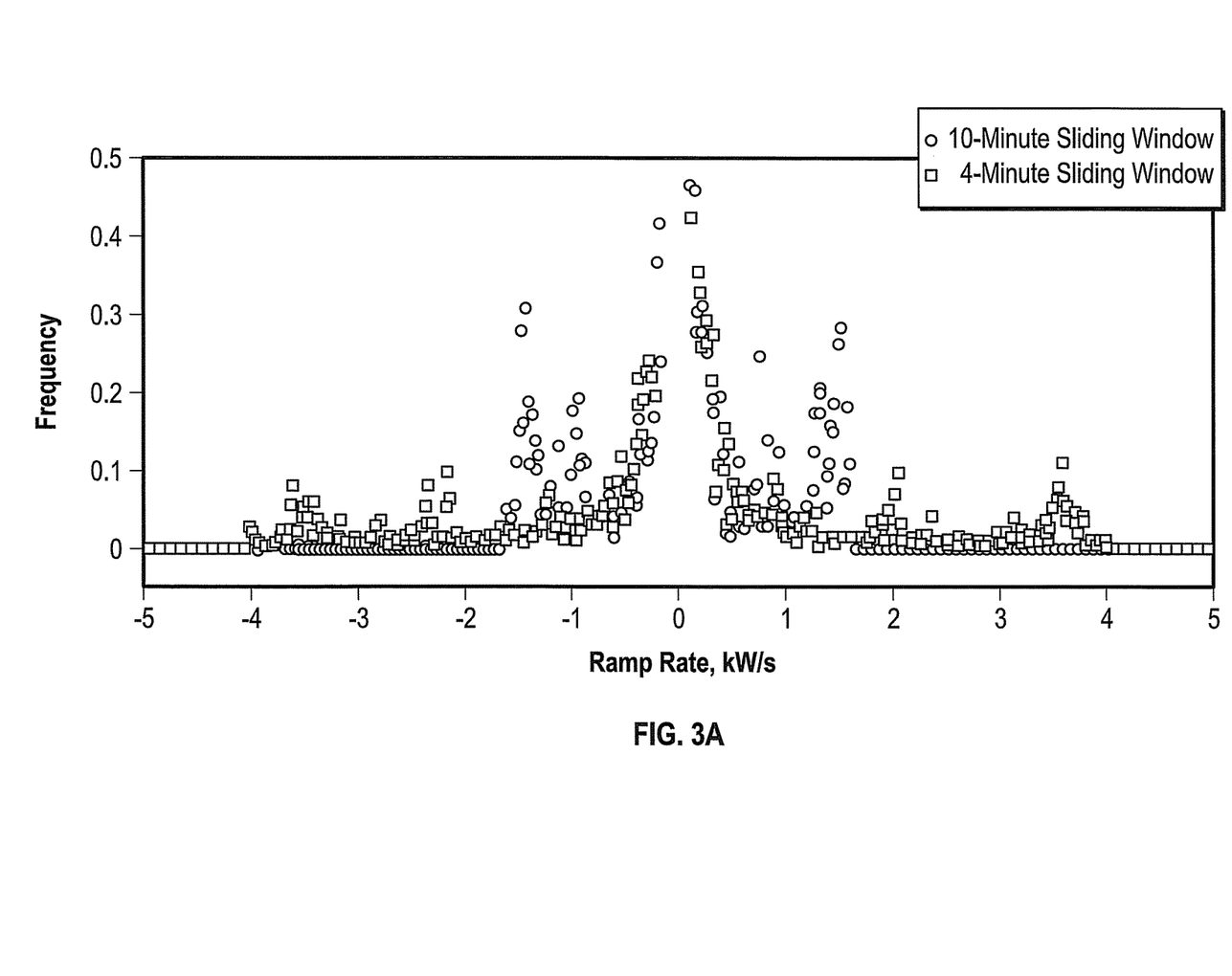
FIGS. 3A and 3B are graphs showing ramp rate for an example system, including a PV array and battery in FIG. 3A and just a battery in FIG. 3B. Note the logarithmic scale on the battery ramp rate distribution.
Figure 3B:
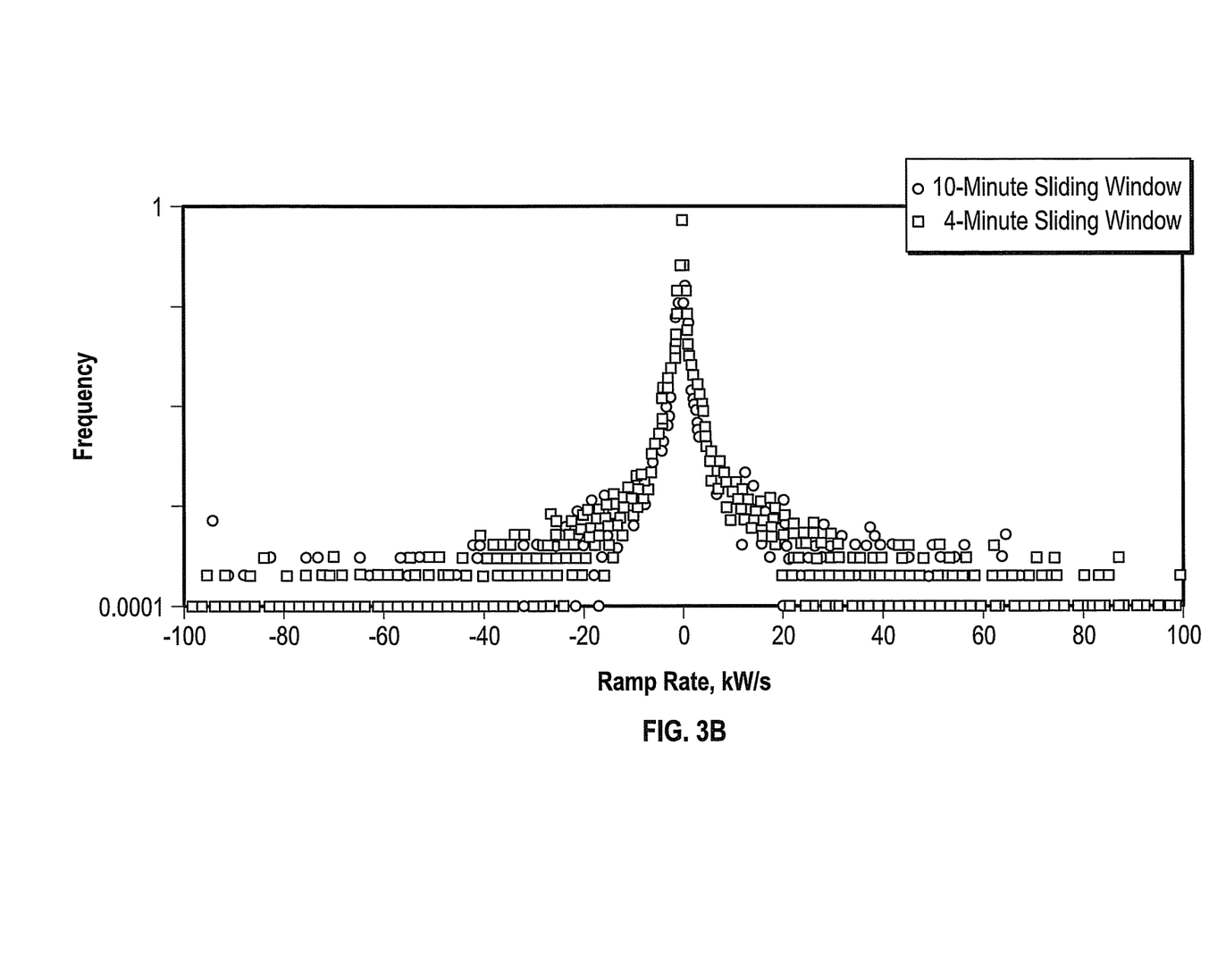

For simplicity, it is assumed here that the PV array power is directly proportional to the solar irradiance, although in general PV efficiency varies with irradiance and the inverter may clip power when this exceeds the inverter's own capacity. The 1-second ramp rate frequency distributions for the system and for the battery is shown in FIGS. 3A and 3B, for both the 4-minute and 10-minute sliding windows, for a system of 1 MW capacity with unlimited battery power. The system ramp rates for both window sizes have a strong peak centered between ±1 kW/s. The ramp rates for the 10-minute sliding window have secondary peaks contained within ±2 kW/s, while the 4-minute ramp rates have secondary peaks contained within ±4 kW/s. In the context of a 1 MW system, ramp rates of this size can be considered in the same league as noise caused by parasitic loads, such as battery air-conditioning systems, so it can be concluded that a 10-minute window and a 4-minute window provide equivalent system performance. It is also important to understand the effect of the window size on the battery itself. This is also shown in FIGS. 3A and 3B. The ramp rate frequency distribution for both window sizes is essentially equal, meaning that the battery demand is also largely unaffected. It is also noteworthy that ramp rates are concentrated within ±20 kW/s, but there are occasional ramp rates up to 100 kW/s in both directions.

Having established that, in terms of system performance and ramping capacity of the battery, there is little difference between using a 4-minute and a 10-minute sliding average. The 4-minute sliding window is preferred even in the case that a trailing window is used, since the lag time is 2 minutes instead of 5. Moreover, predicting solar irradiance 2 minutes ahead is a more achievable task than 5-minute ahead predictions.

Figure 4A:
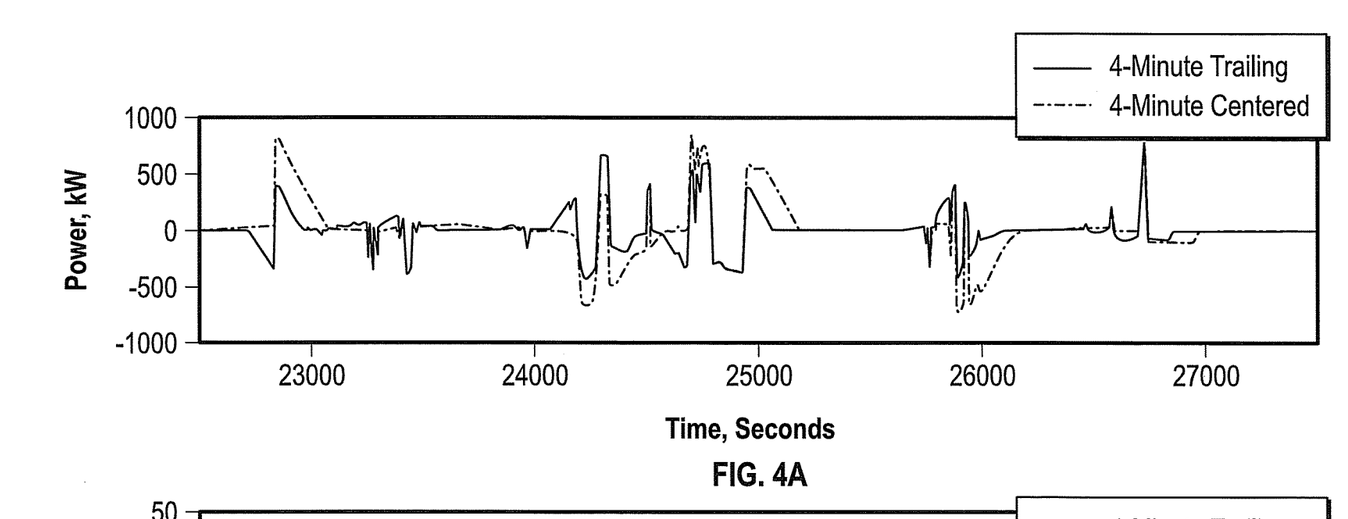
FIGS. 4A and 4B are graphs illustrating power requirements and energy balance for a smoothing battery using a trailing (solid line) and centered (dashed line) moving average as a reference signal.
Figure 4B:
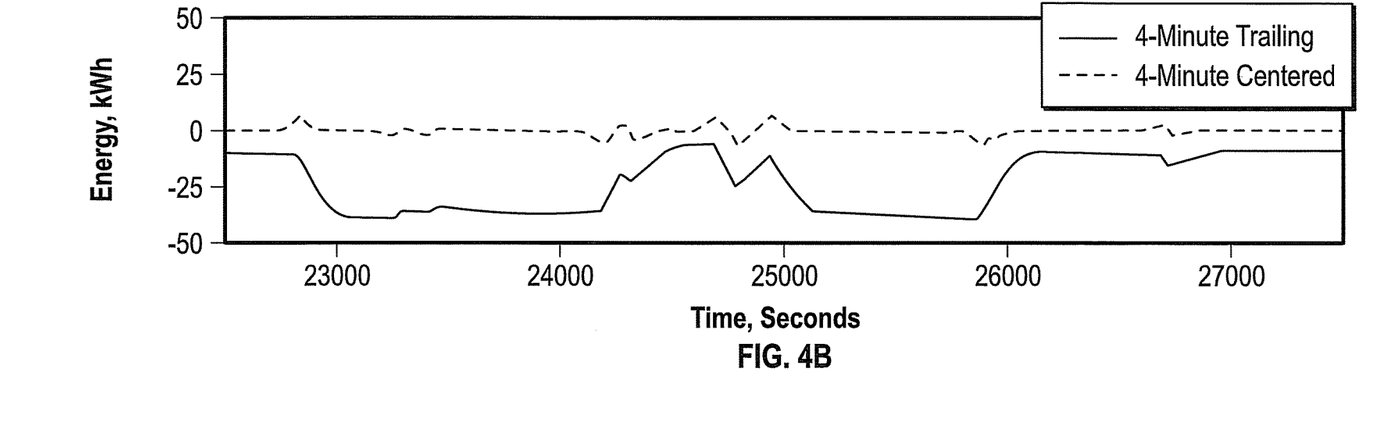

The benefits from using a centered sliding window, rather than a trailing one, are evident from inspection of FIGS. 4A and 4B. In general, the power that the battery is called on to deliver or absorb is smaller when using a centered window. However, the principal advantage comes from the amount of energy that the battery must release or store. The maximum deviation of the state of charge from a nominal value is approximately 8 kWh for the centered window, and 40 kWh for the trailing window.

It is evident from inspection of the plots that the difference between real-time irradiance and average irradiance is generally smaller for the case of the centered sliding window. Thus, by using a centered sliding window, the requirement on the batteries is smaller.

While batteries can be designed for this duty cycle, their lifetime is nevertheless a function of the total energy absorbed or delivered. If it were possible to use a centered window, the lifetime of the smoothing batteries may be extended substantially. This is illustrated in FIGS. 4A and 4B. While the power delivered by the batteries using a centered 4-minute window is comparable to the power delivered by batteries using a trailing window, the energy drawn or stored is approximately 100 times smaller, corresponding to a longer lifetime.

A challenge is that, in the field, only data for past events are available, so that only a trailing sliding window can be used. An embodiment of the present invention provides a short-term prediction for the future (a micro-forecast), at very low cost, making it possible to use a centered window.

Figure 5:
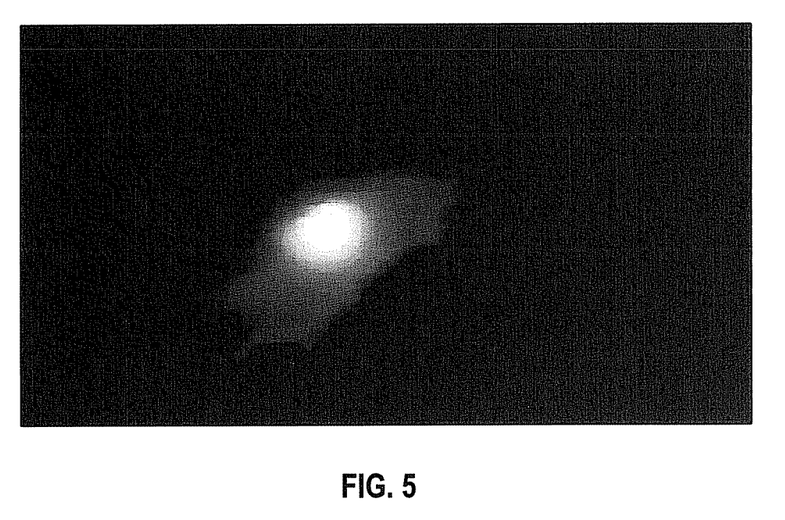
FIG. 5 illustrates a typical near-infrared image of clouds surrounding the sun.

The importance of short-term cloud predictions, as well as means to obtain them, is known. Because of the emphasis on minimal cost, it is assumed that a simple, shadowband-less fixed camera using Si-based charge-coupled device (CCD) technology is used to obtain a prediction. Far infrared imaging is also an option, but is expensive. Si-based CCDs are sensitive to near-IR, and a short-pass filter can be placed in front of the CCD to only allow visible-range photons. When taking images centered around the sun, without a shadowband, there is intense glare from the sun. The sun's image bleeds through to the pixels around the sun's disk, and in addition, there is atmospheric scattering around the solar disk, making it very difficult to clearly see clouds that are approaching the sun. By using a long-pass filter, it is possible to eliminate the visible range entirely from the image projected onto the camera's CCD, along with some of its undesirable side-effects, including glare and atmospheric scattering. And clear images of the solar disk and of neighboring clouds are possible. In a non-limiting example, a digital SLR camera mounted on a tracker (to keep the sun at the center of the image) was used, combined with a Licor (LI200) pyranometer mounted in the vicinity. The camera is triggered by an electrical signal provided by a National Instruments/Labview visual instrument, which simultaneously obtains a reading from the Licor, so that each image can be correlated to an irradiance measurement. An example of such an image is shown in FIG. 5.

Figure 6:
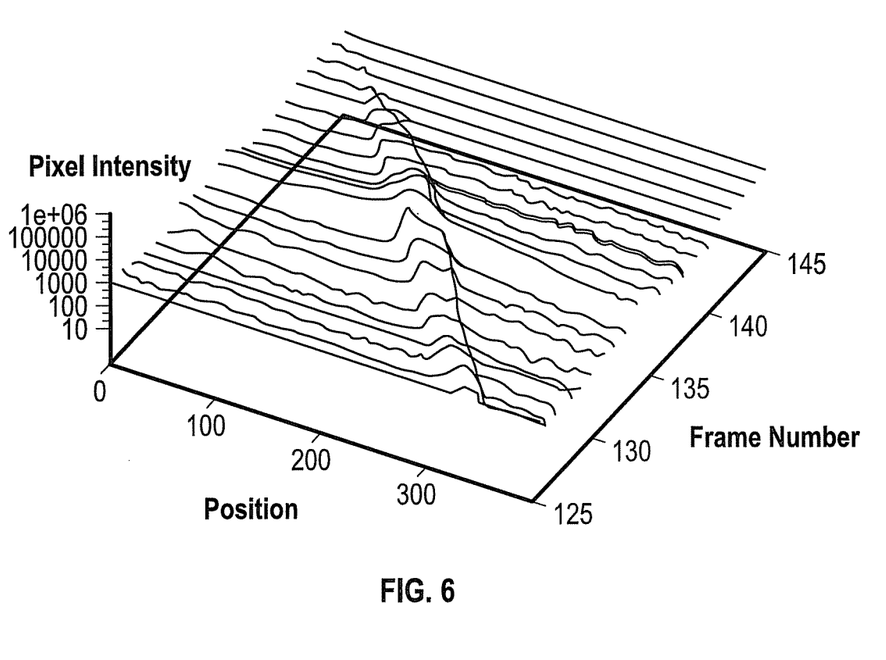
FIG. 6 illustrates pixel intensity along a line in the direction of cloud motion passing through the sun for a series of about 20 frames spaced about 10 seconds apart. An opening in the cloud cover approaching the sun can be seen moving from left to right, coinciding with the sun around frame 135, position 180. The opening can be seen receding after this.

If the sun is not occluded, approaching clouds can be distinguished. Similarly, in a field of dark clouds, an opening in the cloud cover can be seen before it reaches the sun. To illustrate the principle, and in an example, a pixel intensity along a line in the direction of cloud motion passing through the sun was obtained for a series of images spaced ten seconds apart. This is plotted in FIG. 6. The movement of an opening in the cloud cover can clearly be seen, first approaching the sun, then receding. The approaching and receding break in cloud cover can be observed at least 60 seconds before and after its coincidence with the location of the sun.

Figure 7:
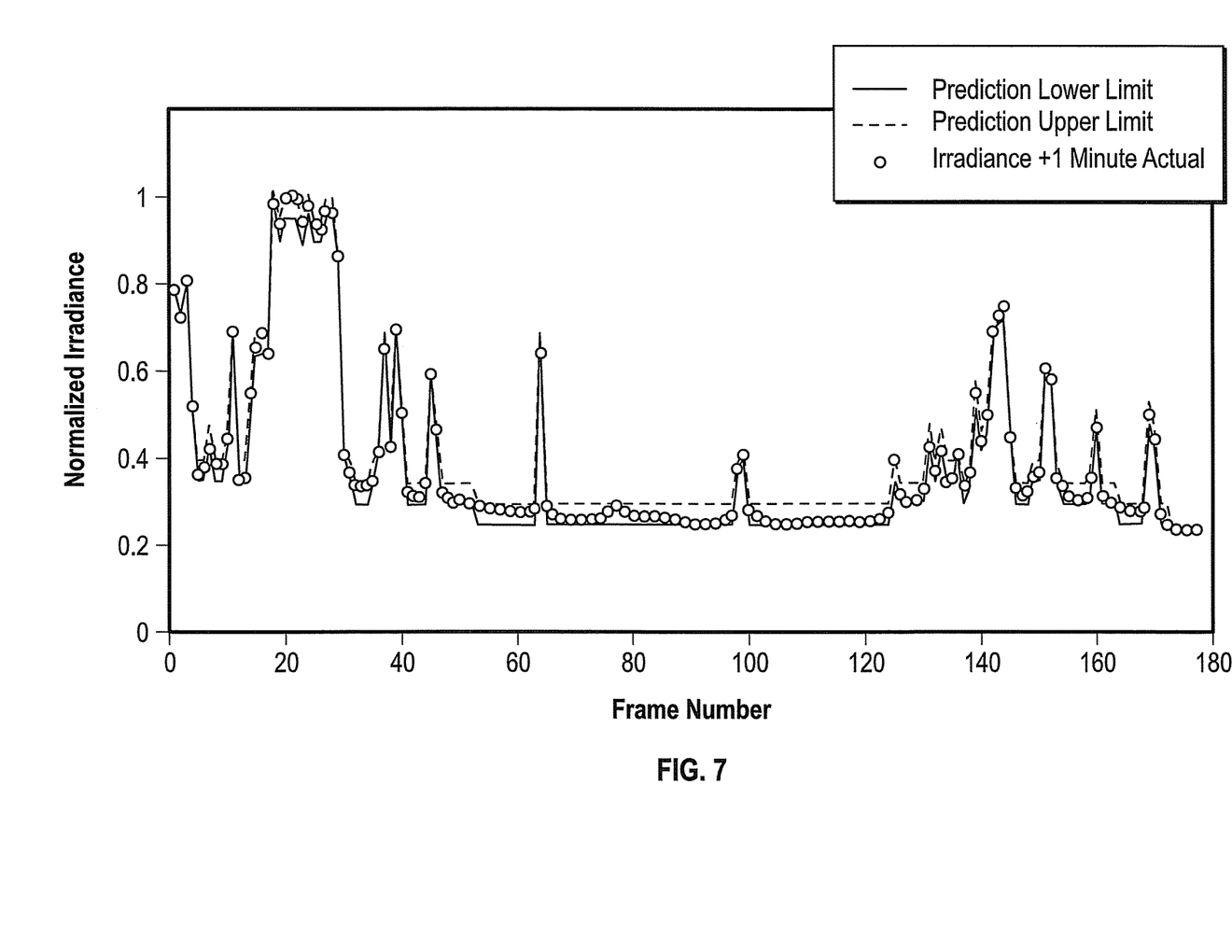
FIG. 7 illustrates a prediction band for the solar irradiance about one minute after the image is presented to a neural network, e.g., a Lateral Adaptive Priming Adaptive Resonance Theory (LAPART) network, shown together with the actual measured value.

Having established the possibility of detecting changes in cloud cover, an embodiment of the present invention includes a tool to interpret the images and provide a forecast, possibly associated with a measure of reliability. In keeping with the stated requirement of cost-effectiveness, the image processing is carried out with relatively small processing power, such as might be available, for example, in a camera-equipped 'smart phone'. To this end, the neural network, e.g., a neural network based on ART, can be applied to associate a particular cloud pattern with an irradiance value about 60 seconds later. Embodiments of the present invention may apply a neural network to an image-based micro-forecast. After training, the computational cost of interpreting the input, which can be a large data set, is minimal, and suitable for deployment on a small portable device. In another non-limiting example, a LAPART neural network was trained using a subset of 180 images from a total of 360, and tested using the remaining subset. Testing is illustrated in FIG. 7. In this example, the network successfully predicted irradiance about 60 seconds in advance of being exposed to an image. Based on these results, it is possible to obtain predictions about 120 to about 180 seconds in advance.

Figure 8:
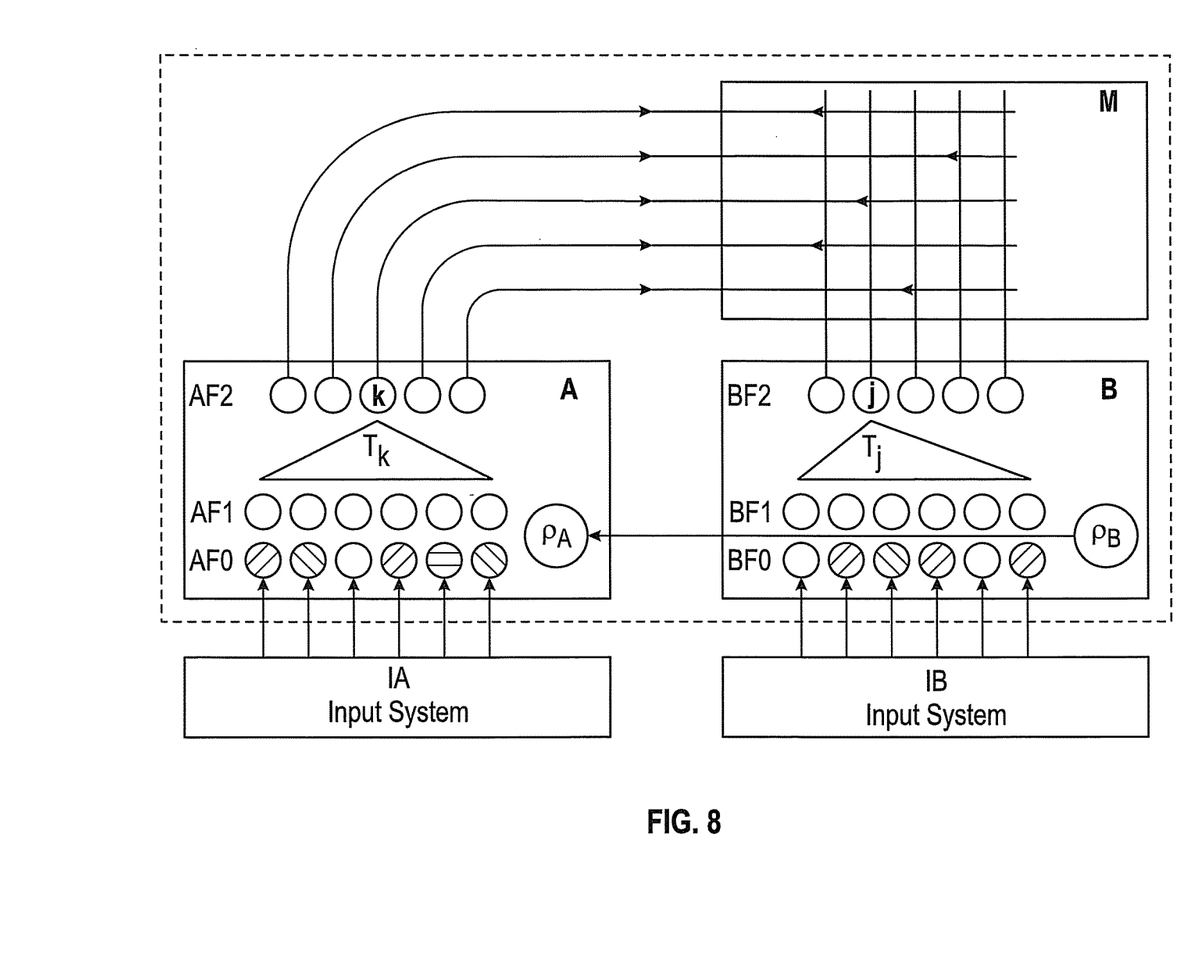
FIG. 8 illustrates a diagram of a LAPART type neural network that associates the output from classifier A with the output from classifier B.

In one embodiment of the present invention, a modified consumer-grade CCD camera is used to collect images of the sky. The camera is preferably modified so that near-IR light (wavelength less than about 1000 nm) makes it to the CCD, while visible light is cut off. The result is images with better definition of the cloud features, especially close to the sun. Then, the direction of motion of the clouds is obtained by cross-correlating successive images. The pixel intensity for a stripe in the direction of cloud motion is obtained across a solar disc. The pixel intensity string, alongside with measured solar intensity data from a light sensor, are used as inputs to the neural network (as discussed above). Referring to FIG. 8, the neural network associates the output from classifier A with the output from classifier B. In one embodiment, a cloud pattern category is associated with a future solar irradiance category. Predictions from real data are accurate up to several minutes ahead.

Figure 9:
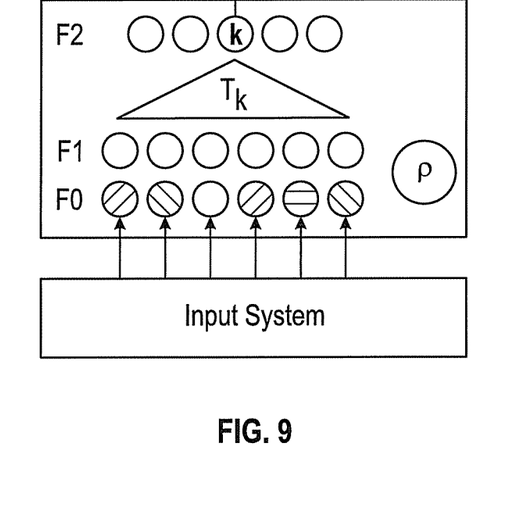
FIG. 9 illustrates one input classifier of the neural network.

The embodied neural architecture is in a class of self-organizing learning systems. When presented an input pattern, the network rapidly categorize the input pattern as a member of either an existing category or a new (novel) category. If an existing category matches the pattern, then the network responds with an existing output code indicating its membership in a category. If no existing category matches, then the network creates a new output code that in the future responds to the novel pattern. FIG. 9 shows the input system and internal network structure. The input system generically represents the source of training data for the system. The input layer is labeled F0 while the output layer is labeled F2. For the particular architecture used in this example, the output layer is a winner-takes-all structure; the output code for a given category of input pattern was represented as a single active F2 neuron. As new categories are required, the size of the F2 layer grows.

Figure 10A:
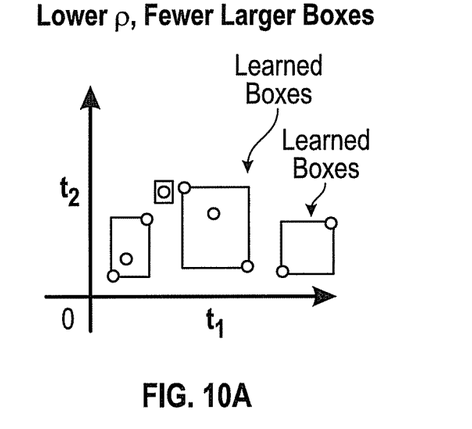
FIGS. 10A and 10B illustrates how the neural network classifies data at different levels of associativity.
Figure 10B:
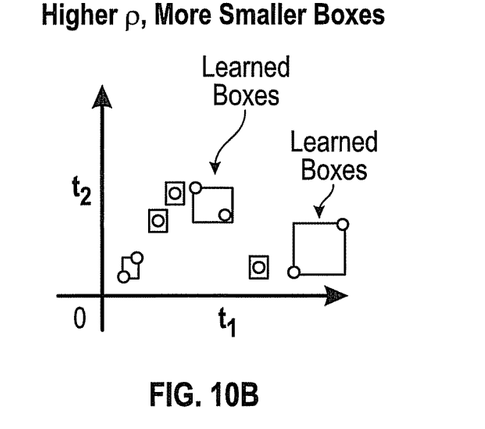

Internal to the network architecture are weighted connections associated with each category neuron in the F2 layer that adapt during learning. For a given presentation of an input, only the weights associated with the active F2 neuron are modified. These weights are symbolically represented as the triangle marked Tk in FIG. 9 for the winning neuron k in the F2 layer. The weights Tk may be interpreted as a prototype of the input patterns that activate neuron k. That prototype takes the form of a hyperbox containing all of the patterns that are members of a category, as shown in FIGS. 10A and 10B.

With a specific choice of internal configuration, this architecture tends to exhibit single epoch learning convergence. That is, given a finite number of training patterns, the number of learned categories and all internal connection weights converge to their final values in one presentation epoch. During the second epoch, it is possible that individual patterns will change category membership, but this movement will cease in subsequent epochs. As discussed above, the granularity parameter p determines the ultimate number of categories learned during the first epoch. When this parameter is unity, the number of categories equals the number of unique training patterns, thus memorizing the training set. When this parameter is near zero, the number of categories approaches unity, thus over-generalizing on the training set. The choice of this parameter is therefore strongly application dependent. As discussed above, neural architectures learn to categorize similar patterns through a process of clustering. For this example, a cloud image may be represented as a list of pixels: I={i1, i2, . . . , in−1, in}, where n is the number of pixels in the image. Each category is assigned a number and is represented by a learned set of connection weights referred to as a prototype. As can be seen in FIGS. 10A and 10B, the length of the sides of a box for a prototype is determined by the variation of the patterns that were clustered together into that category. In other words, the prototype box is sized to contain all of the patterns that are members of this cluster, but no larger. For our application, a prototype is composed of n pixel value ranges.

An example network architecture based upon the lateral coupling of two sub-networks, referred to as A and B, is shown in FIG. 8. One example of a network architecture is a Fuzzy Artmap architecture. The interconnections between the two sub-networks force an interaction of the respective classifications performed by the sub-networks. This modifies their unsupervised learning properties to allow the learning of inference relationships or associations between the learned pattern categories representing their input domains. This can be thought of as supervised learning, or supervised classification. The input patterns, network layers, and prototype templates are labeled with an A or B referring to the A or B sub-networks.

In a typical application, a sequence of pairs of input patterns IAk and IBk are presented to sub-networks A and B, respectively. As A and B form category prototypes for their inputs, the network learns inference relations between their category through a learning process by forming strong interconnections between pairs of simultaneously-activated F2A and F2B nodes. Convergence of the network in a finite number of passes through a training set requires that it reach the following operational state: Presentation of any input pair (IAk, IBk) from the training set results in pattern IA being assigned a category in sub-network A through direct access to its template. Through a strong, learned-inferencing connection, the active category F2 A node signals a unique F2B node to which it is connected, forcing it to become active. This results in the inferred B category template being read out over the F1B layer just as pattern IB reaches the F1B layer. The ensuing vigilance test in sub-network B confirms that the inferred category is an acceptable match for 1B, forcing the sub-network B vigilance node to remain inactive. A final pass through the data results in no resets and no synaptic strength changes (i.e., no learning).

The present approach to learning the relationships between cloud patterns and their movement at one time, and PV array irradiance at a future time utilizes a neural network. In the prototype application example, circumsolar cloud images are processed and presented to sub-network A. The solar irradiance signal at a future time is presented to sub-network B. As the sub-networks form category codes for these inputs, the network learns inference relations between them within the lateral connection matrix, see FIG. 8. As assessment of the predictive performance of the prediction at any given stage of leaning may be produced by testing it with a validation set of labeled data.

During testing, all learning is disabled. A sequence of pairs of input patterns IAk and IBk are drawn from the validation set and presented to sub-networks A and B, respectively. If pattern IAk is assigned a category in sub-network A through direct access to a prototype and there exists a lateral connection from its AF2 node to a B sub-network F2 node, the inferred B category's template is read out into the BF1 layer in the B sub-network. A prediction includes the inferred B node index and the associate template hyperbox. A correct inference occurs when the IBk input falls within the inferred hyperbox. An inference error occurs when the IBk input falls outside of the inferred hyperbox. When an input arrives at the A sub-network for which there is no direct access prototype and therefore no inferred B prototype, then an anomaly is declared. The suite of performance statistics after passing through the validation set includes the following: 1) percentage of correct inferences, 2) percentage of inference errors, 3) percentage of anomalies, 4) RMS distance of samples outside of hyperboxes when inference errors occur. In addition, plots the validation IB inputs with the predicted hyperboxes is produced.

Figure 11:
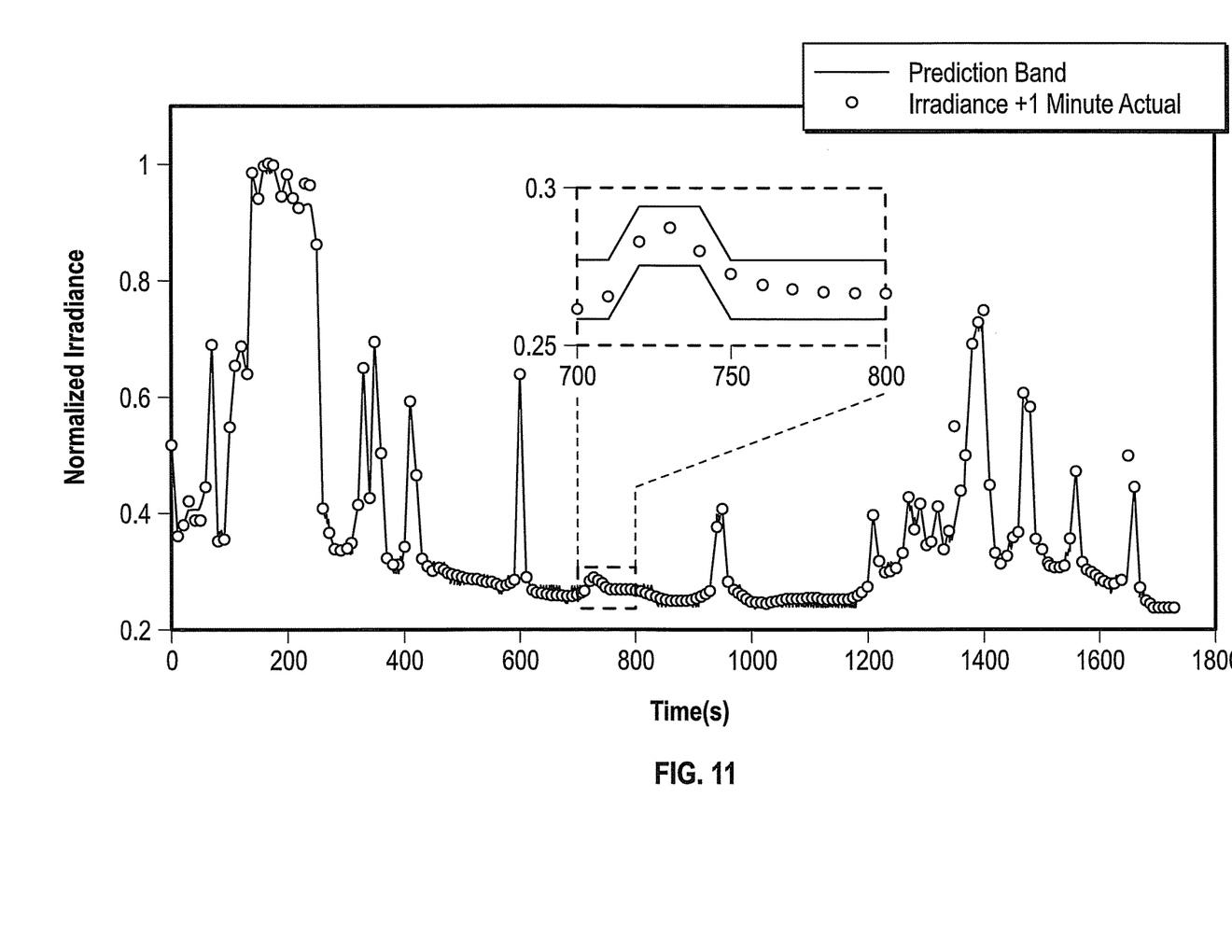
FIG. 11 illustrates a prediction of normalized irradiance with a prediction band representing the high and low predictions within a certain confidence interval.

In one example, the input to the neural network was pre-processed by measuring pixel intensities along a line through the sun and in the direction of cloud motion. Thus, each input to the A sub-network corresponds to a the pixel intensity trace similar to the ones shown in FIG. 6, while the corresponding input to sub-network B is the irradiance value 60 seconds later. The total number of samples is 360. For calculating performance measures, the data are equally partitioned into training and validation sets. Training required three passes (epochs) through the training set while performance assessment required a single pass through the validation set. To remove any partitioning bias, the data were shuffled prior to partitioning. For this example, performance measures were averaged over 100 shuffles. Testing is illustrated in FIG. 11. It is evident that the network successfully predicts irradiance 60 seconds in advance of being exposed to an image. Based on these results, there can be predictions 120 to 180 seconds in advance.

The performance of the predictor is a function of the vigilance parameters ρ that are applied to each of the sub-networks A and B. To measure the effect of ρ, a number of tests were performed with a constant value of ρA and various values of ρB, meaning that the granularity of cloud categories was kept constant, while the granularity of irradiance categories varied.

TABLE 1

PREDICTION PERFORMANCE AS A FUNCTION OF $\rho_B$

| $\rho_B$ | % ê | $\sigma_e$ | % û | $\sigma_u$ | Δ | S | $\sigma_S$ | E |
|---|---|---|---|---|---|---|---|---|
| 0.80 | 4.87 | 1.89 | 0.49 | 0.78 | 43.7 | 189.2 | 88.8 | 232.9 |
| 0.84 | 5.20 | 2.61 | 0.47 | 0.78 | 33.4 | 160.5 | 52.7 | 193.9 |
| 0.88 | 6.61 | 2.57 | 0.76 | 1.02 | 30.5 | 131.7 | 19.5 | 162.2 |
| 0.92 | 8.85 | 2.92 | 0.92 | 1.06 | 22.6 | 68.3 | 34.6 | 90.9 |
| 0.94 | 10.74 | 3.71 | 1.61 | 1.14 | 20.1 | 49.3 | 26.9 | 69.4 |
| 0.96 | 15.24 | 3.52 | 2.23 | 1.70 | 14.1 | 29.4 | 19.5 | 43.5 |
| 0.98 | 19.42 | 4.07 | 3.94 | 1.93 | 7.9 | 14.2 | 10.1 | 22.1 |

In Table 1 above, ê/$\sigma_e$ are mean/standard deviation of percentage of inference errors (an inference error is where the actual irradiance falls outside the predicted B template interval (1D hyperbox)); û/$\sigma_u$ are the mean/standard deviation of percentage on anomalies (an anomaly is where there is no resonant A template for a cloud pattern); Δ is the RMS distance the actual irradiance falls outside the predicted B interval when an inference error occurs, in units of irradiance; Š/$\sigma_S$ are the mean/standard deviation of predicted B template size, again in units of irradiance; E is the sum of Š and $\sigma_S$, and can be considered as a total prediction error. As $\rho_B$ increases, the number of irradiance categories (1-D hyperboxes) increases, so that a better match for the cloud pattern category (360-D hyperboxes) can be found. Correspondingly, the total error decreases. Note that with $\rho_b$=0.98, the prediction error is only 2% of maximum irradiance.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method of forecasting solar energy irradiance potential and subsequent photovoltaic output in a region, the method comprising:

collecting meteorological data for a given region via an image sensor;

estimating irradiance levels using parameters collected from the meteorological data via a neural network coupled to the image sensor; and forecasting solar energy irradiance potential and subsequent photovoltaic output in the given region using the collected meteorological data, estimated irradiance levels, and physical characteristics of a solar generating system in the given region at one or more times in the future via the neural network.

2. The method of claim 1, wherein the image sensor is a shadowband-less fixed camera using a Si-based sensor or other lower energy photon sensors.

3. The method of claim 1, further comprising analyzing surrounding and occluding clouds as seen from one or more images from the image sensor.

4. The method of claim 1, wherein the image sensor takes a picture with lower energy photon wavelengths and is less sensitive to higher energy photon wavelengths.

5. The method of claim 1, further comprising simulating future solar energy production of a utility system based on the forecast of solar energy irradiance potential and subsequent photovoltaic output.

6. The method of claim 1 wherein the neural network comprises a neural network architecture.

7. The method of claim 1, wherein the neural network comprises a Lateral Adaptive Priming Adaptive Resonance Theory (LAPART) neural network.

8. The method of claim 6, wherein the neural network architecture comprises weighted connections associated with each category neuron in a layer that adapts during learning.

9. The method of claim 1 wherein the neural network comprises a sub-network and wherein cloud images are processed and presented to the sub-network.

10. The method of claim 9 wherein the neural network comprises a second sub-network comprising a solar irradiance signal at a future time.

11. The method of claim 5 further comprising smoothing photovoltaic output using a battery system based on the simulated future solar energy production.

12. The method of claim 5 further comprising adjusting the energy requirements produced by the utility system based on the simulated future solar energy production.

13. An apparatus for forecasting solar energy irradiance potential and subsequent photovoltaic output in a region, the apparatus comprising:

an image sensor for collecting meteorological data for the region;

a neural network coupled to the image sensor for estimating irradiance levels using parameters collected from the meteorological data, wherein the neural network forecasts solar energy irradiance potential and subsequent photovoltaic output in the region using the collected meteorological data, estimated irradiance levels, and physical characteristics of a solar generating system in the region at one or more times in the future;

wherein the neural network simulates future solar energy production; and a utility system coupled to the neural network, wherein energy requirements of the utility system are adjusted based on the simulated future solar energy production determined by the neural network.

14. The apparatus of claim 13 wherein the image sensor is a shadowband-less fixed camera using a Si-based sensor or other lower energy photon sensors.

15. The apparatus of claim 13 wherein the image sensor comprises infrared imaging.

16. The apparatus of claim 13 wherein the neural network comprises a neural architecture.

17. The apparatus of claim 13 wherein the utility system includes a photovoltaic system.

18. The apparatus of claim 17 wherein the utility system includes one or more batteries coupled to the photovoltaic system.

19. The apparatus of claim 13 wherein the neural network comprises a sub-network where cloud images are processed and presented to the sub-network.

20. The apparatus of claim 19 wherein the neural network comprises a second subnetwork comprising a solar irradiance signal at a future time.

21. The apparatus of claim 13 wherein the neural network comprises a self-organizing neural network.

22. The method of claim 1 wherein the neural network comprises a self-organizing neural network.

* * * * *